United States Patent [19]

Long et al.

[11] 4,127,800
[45] Nov. 28, 1978

[54] MEANS FOR ADJUSTMENT OF SPEED OF PRIME MOVER

[75] Inventors: Donald E. Long; Robert J. Rushby, both of Waterloo; Krantikumar V. Toraskar, Hamilton, all of Canada

[73] Assignee: NCR Canada Ltd - NCR Canada Ltee, Mississauga, Canada

[21] Appl. No.: 755,779

[22] Filed: Dec. 30, 1976

[51] Int. Cl.² .......................................... G05B 19/40
[52] U.S. Cl. ................................... 318/685; 318/696
[58] Field of Search ................................ 318/696, 685

[56] References Cited

U.S. PATENT DOCUMENTS 3,863,118  1/1975  Lander et al. ..................... 318/685
3,865,030  2/1975  Chida et al. ....................... 318/696

Primary Examiner—Robert K. Schaefer
Assistant Examiner—M. K. Mutter
Attorney, Agent, or Firm—J. T. Cavender; Wilbert Hawk, Jr.; George J. Muckenthaler

[57] ABSTRACT

A microprocessor is programmed to generate reference envelopes of a specified time duration and synchronized with clock pulses, and circuit means is associated with such microprocessor for indicating desired speed of a prime mover through comparison of prime mover actual speed with said reference envelope, and means is provided for adjusting prime mover speed to correspond with such reference envelope.

12 Claims, 10 Drawing Figures

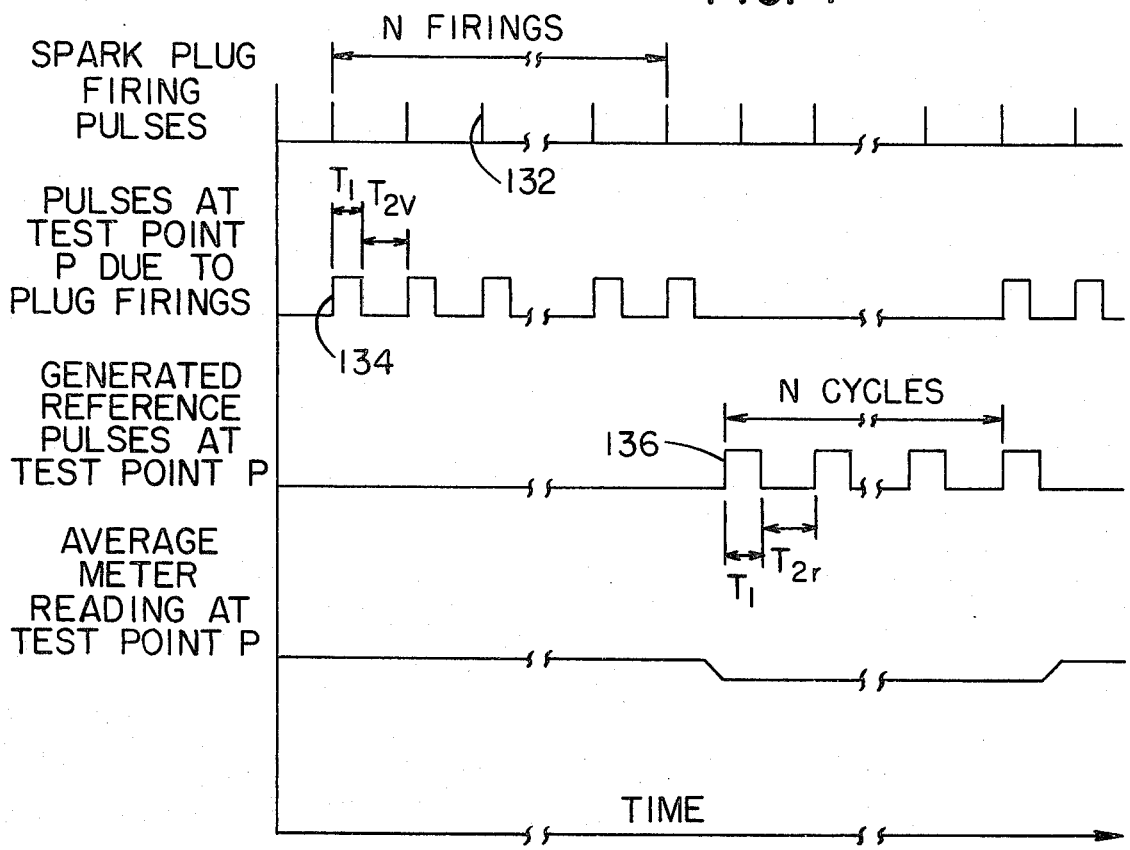
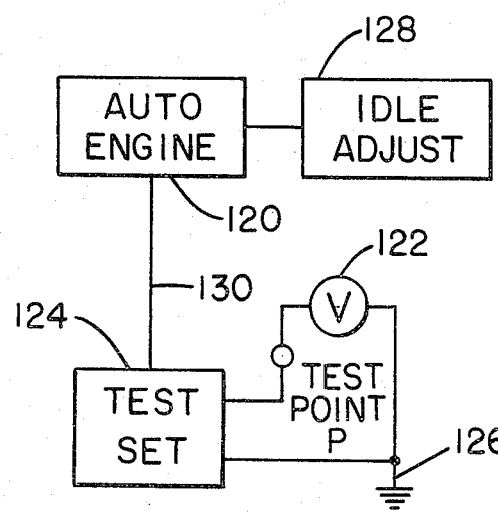
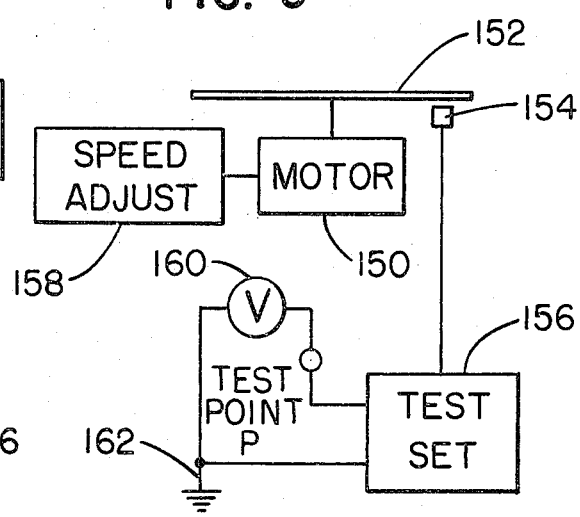

I = 0 (COUNTER SET POINT)

SPARK PLUG FIRED ?

OUTPUT PULSE LENGTH $T_1$ AT TEST POINT P.

I = I + 1 (COUNTER SET + 1)

I = N ?

I = 0

OUTPUT PULSE LENGTH $T_1$ AT TEST POINT P.

DELAY FOR TIME $T_{2r}$.

I = I + 1

I = N ?

MEANS FOR ADJUSTMENT OF SPEED OF PRIME MOVER

BACKGROUND OF THE INVENTION

In high speed operation of rotating parts, it is necessary to maintain such parts at a rate of rotation which provides for reliable and efficient results in accordance with predetermined levels. In the field of printing, for example, when the printing is accomplished by means of impact mechanism striking a character bearing member of the rotating type, such member must be rapidly moved into position for each and every character thereon to be struck by the impact mechanism. The character bearing member may, for example, be in the form of a drum or typewheel which is driven by a motor, the speed of such motor being maintained to make certain that the drum or typewheel is in the proper position at the instant that the impact mechanism is driven against the selected character thereon for printing of such character. It is, therefore, necessary that the speed of the motor driver for the character bearing member be adjusted so that such member can be positioned sufficiently fast to avoid printing a character too late in the cycle, while at the same time seeing that the motor is not driven faster than its rated speed. Of course, the motor speed control system should include provision for adjusting the speed of the motor so as to obtain a specified number of bearing member character positions in a predetermined time to meet the requirements of the operation.

A number of ways and means for controlling motor speeds have included both simple and complex systems. Representative of control systems in the prior art is U.S. Pat. No. 2,706,270, issued on Apr. 12, 1955 to F. G. Steele, which discloses a digital control system including a pair of pulse carrying channels for controlling the setting of a pair of reversing switches connected to rotate the armature of a motor, on the occurrence of each clock pulse, in the direction dictated by the information. U.S. Pat. No. 3,237,178, issued on Feb. 22, 1966 to A. G. Valentine, discloses control apparatus for a closed loop system having a phase detector, a reversible counter, flip-flop means or computer means, and a digital to analog converter or voltage switch means. Indicating means in the form of a voltmeter is connected to receive an analog output signal from the voltage switch means. U.S. Pat. No. 3,586,953, issued on June 22, 1971 to C. O. Markkanen et al., shows a stepper motor control system including an encoder which develops a coded signal representative of a plurality of shaft positions on either side of a reference position. Coded signals representative of the desired position of the motor and shaft position signals are applied to a comparator and logic circuit which develops output pulses to bring the coded signals and the position signals into coincidence. Another U.S. Pat. No. 3,648,141, issued on Mar. 7, 1972 to D. W. Scheer, shows a tape drive error-canceling system having a speed control circuit using comparator means for comparing a capstan speed responsive variable frequency signal with a reference frequency proportional to a desired capstan speed. A memory stores a separate speed correction signal for each of the capstan angular positions. The memory information is read concurrently with a sensing of each position and applied with the output signal from the comparator means to motor energizing means to control the capstan speed. U.S. Pat. No. 3,659,524, issued on May 2, 1972 to J. Beery et al., shows a printer control system including first drive means operated at one speed and second drive means operated at a slower speed, with means for detecting the presence of a document. The control means also synchronizes the operation of the print hammer, the print wheel and document movement responsive to speed of the document. And, U.S. Pat. No. 3,838,258, issued on Sept. 24, 1974 to D. J. Logan, discloses a control system for a step motor which includes a computer to control the energization of the motor in response to information supplied thereto. Motor increments are produced by the computer program without the aid of an external clock or feedback signals from the motor. The computer program includes one wait loop following each change in the output word to provide a predetermined delay preceding the next word change and to control the motor velocity.

SUMMARY OF THE INVENTION

The present invention relates to method and apparatus for adjusting the speed of a prime mover in the nature of a stepping motor and more particularly to the providing of a control system which utilizes a microprocessor having clock pulse and processor memory capability for generating timing signals designated as reference and speed envelopes. Upon starting rotation by the first phase switching of the prime mover, a one-shot multivibrator, hereinafter referred to as speed one-shot and associated with the prime mover, is triggered so as to generate two pulses for each character step of rotation of the character bearing member, with subsequent phase switchings of the prime mover occurring on the falling edge of each of the speed one-shot pulses, with the resultant observation that the width of such speed one-shot pulses affects the times of phase switching and the speed of rotation of the motor. The leading edge of a particular speed one-shot pulse triggers a further one-shot multivibrator, hereinafter referred to as delay one-shot and associated with the microprocessor, and the final phase switching of such prime mover occurs on the falling edge of this further one-shot pulse. A first signal or speed envelope in the nature of a voltage pulse is produced at a test point with such signal beginning at the first phase switching of the prime mover and ending at the triggering of the delay one-shot.

For a seven character sequence of stepping motion, the width of the first signal or speed envelope is a predetermined duration of time, and means for adjusting the speed one-shot is desirable for achieving the correct relationship of pulsewidth-time duration. At regular intervals of repeated seven character sequence cycles, an indicating means in the nature of a moving needle meter is connected for indicating a voltage reading which is proportional to the width of the speed envelope. During alternate time intervals of approximately 1 second, the stepping motor is moved through the seven character sequence twenty times, with each seven character stepping sequence being synchronized with a transport clock having a nominal period of time sufficiently long to allow the meter to settle to an average voltage indication. During the opposing one second alternate time intervals, a second signal or reference envelope is generated by the microprocessor through programmed delays at the speed envelope test point of a determined time duration in width and is also synchronized with the transport clock at the rate of 20 times in approximately 1 second. These alternate time interval happenings are continued as long as necessary for adjusting the speed one-shot and observing a steady position of the meter — which steady position indicates that the width of the speed envelope is equal to the width of the reference envelope as any percentage difference in the width of the two envelopes is directly proportional to the difference in voltage readings.

In view of the above discussion, the principal object of the present invention is to provide a simplified method for adjusting the speed of a prime mover.

Another object of the present invention is to provide a method utilizing present circuitry in apparatus which requires speed adjustment of a prime mover.

An additional object of the present invention is to provide means for indicating the relative speed of the prime mover.

A further object of the present invention is to provide reference and speed envelopes at a test point for observing indication of need for adjustment in speed of a prime mover.

Additional advantages and features of the present invention will become apparent and fully understood from a reading of the following description taken together with the annexed drawing, in which:

FIG. 6 is a block diagram of the speed adjustment system for a modified form of the invention;

FIG. 7 is a timing chart of the pulsing signals of the modification shown in FIG. 6;

Figure 8:
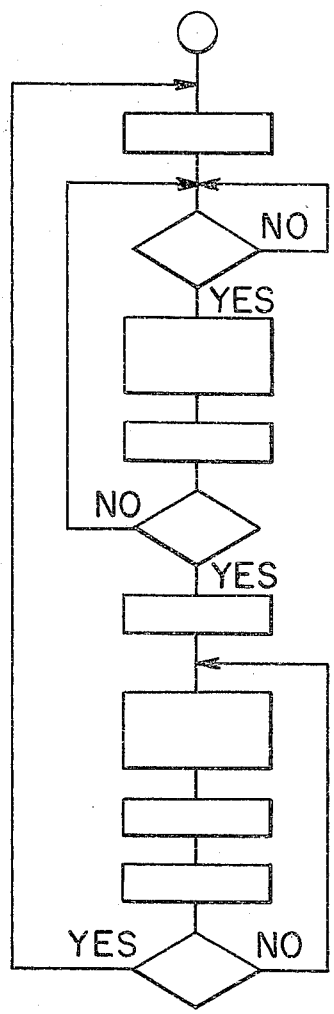
FIG. 8 is a flow diagram of the implementation of the speed adjustment of the invention modification shown in FIG. 6.
Figure 10:
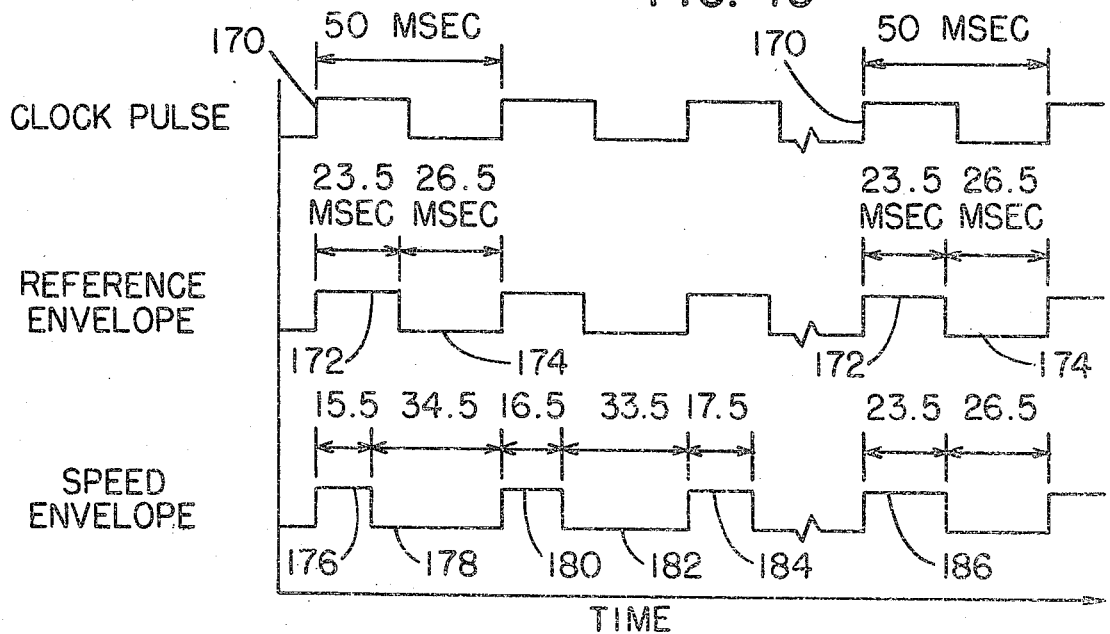

FIG. 9, on the sheet with FIGS. 6 and 7, is a block diagram of the speed adjustment system of a further modified form of the invention; and FIG. 10, on the sheet with FIG. 8, is a timing chart showing the relationship of the speed and the reference envelopes to the clock pulse.

Figure 1:
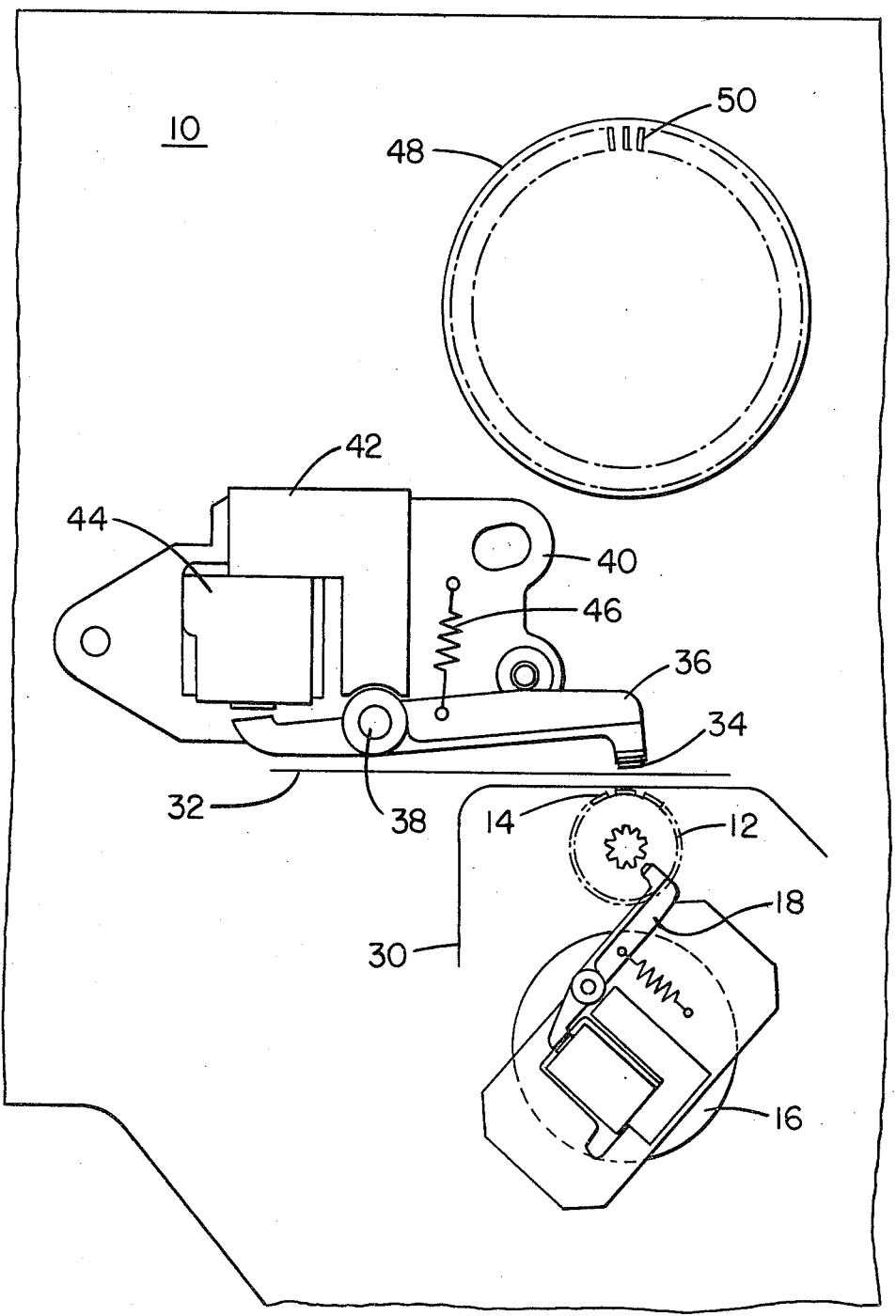
FIG. 1 is a side elevational view of encoding mechanism employing a stepping motor and with which the present invention is associated.

The encoding mechanism of the preferred embodiment of the instant invention basically includes a typewheel, a stepping motor for driving and controlling the rotation and position of the typewheel, and an electromagnetically operated hammer, the impact of which can be controlled by potentiometers to regulate hammer force to suit specific characters on the typewheel. FIG. 1 shows, in a side elevational view, the important parts of such an encoding mechanism as supported from a mounting plate 10 which may be one side frame member of a business machine. A typewheel 12 with type characters 14 on the periphery thereof is driven and controlled in incremental manner by a stepping motor 16, and an aligner mechanism 18 is positioned adjacent the motor 16. The aligner mechanism 18 is provided with well-known aligning bar, etc. engageable with the typewheel 12 for holding the typewheel in precise position during the printing operation. A ribbon 30 is caused to be driven in a path above the typewheel and a check or like document 32 may be placed or positioned above the ribbon 30 to be contacted by the impact face 34 of a hammer 36 carried on a pivot 38 of a hammer frame 40. A hammer core 42 and a hammer coil 44 are carried on the frame 40 to operate the hammer 36 against the return force of a spring 46. A timing disc 48 having a plurality of slots or apertures 50 along the circumference thereof is rotatably supported adjacent the hammer 36 and the typewheel 12, and is operably connected with the motor 16. While the showing and the description of the encoding mechanism are limited in scope, the various parts and the operation of these parts are generally well-known in the encoding of documents.

Figure 2:
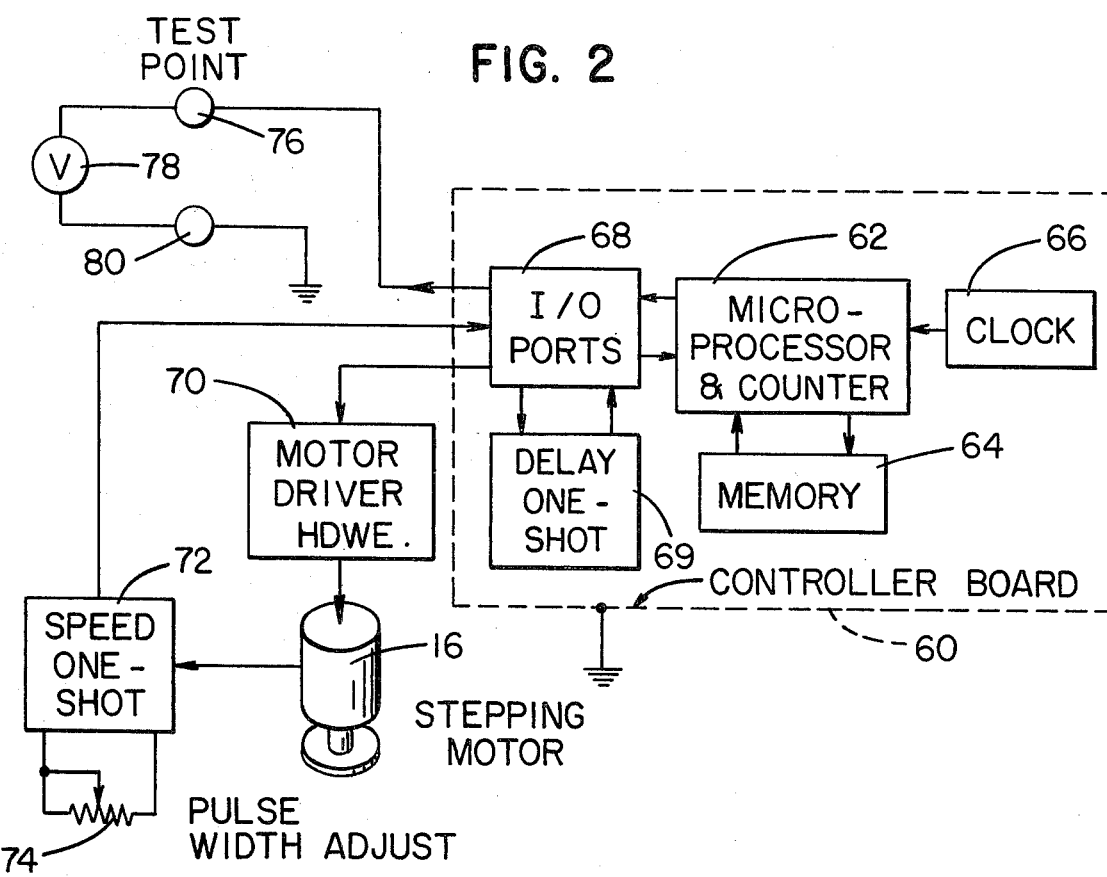
FIG. 2 is a diagrammatic view of the major components of the stepping motor speed adjusting system.

In FIG. 2 is shown a block diagram of the major components of the speed adjusting system for the stepping motor 16, wherein a controller board 60 includes a microprocessor 62, one type of which may be the MCS-4, as manufactured by Intel Corporation, associated with a memory 64 having instructions stored therein in any well-known manner for implementing the invention, a clock 66 for providing pulses of a predetermined rate to the microprocessor 62, and an input/output device 68 associated with the microprocessor 62 and the control circuits distal from the board 60. The memory 64 includes read only and random access (ROM and RAM) capability, and the microprocessor has a counter for tracking the number of envelopes or repeats of nominal one second time periods. A delay one-shot 69, of the monostable multivibrator type, is triggered by the microprocessor at programmed intervals and the microprocessor also receives return signals from the one-shot when the delay is completed. The driver hardware 70 for the motor 16 is connected to the I/O device 68 for receiving pulses therefrom for driving the motor 16. A speed one-shot 72, of the monostable multivibrator type, receives trigger pulsing signals from the motor 16 via timing disc 48 operated thereby and sends signals to the I/O device 68, the one-shot 72 having an adjustable device 74, in the form of a potentiometer, for adjusting the width of the pulse or signal to the I/O device 68. The motor driver hardware 70 and the speed one-shot 72 comprise a portion of driver board adjacent the controller board. An exterior connection from the I/O module 68 also includes a signal path to a test point 76 to which is connected a moving needle voltmeter 78, such voltmeter being connected to a point 80 at ground potential.

Figure 3:
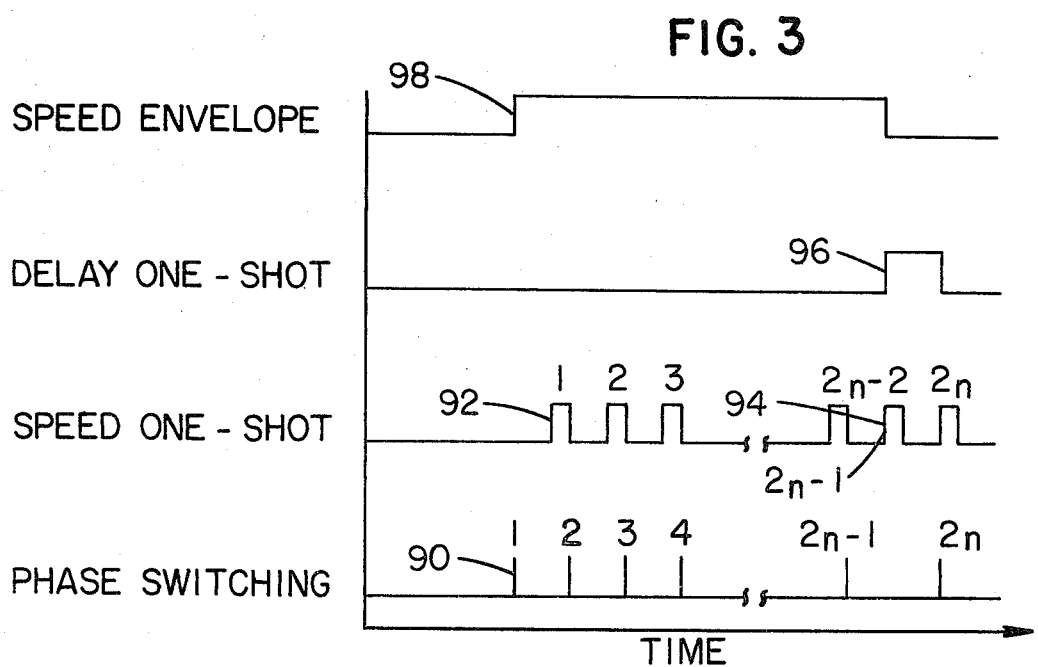
FIG. 3 is a timing chart of the pulsing signals of the system.

A timing chart is shown in FIG. 3 wherein the timing relationship for "n" number of character steps of the stepping motor 16 is indicated only for a number of phase switching times. The first phase switching shown as 90 causes the motor 16 to begin rotating from a rest condition with speed one-shot 72 pulses 92 (two for each character step) being triggered by the rotation of the motor and sensed by the microprocessor 62. For a seven character step of the motor 16, a total of fourteen such pulses 92 are triggered and are read by the microprocessor 62. Subsequent phase switchings (except for the final switching) occur on the falling edge of the speed one-shot pulses. It is thus seen that the width of the speed one-shot pulses affect the times of phase switching and the speed of rotation of the motor 16. As the pulsewidth 92 of the one-shots decreases, the phase switchings 90 are compressed in time and the motor stepping speed is increased, whereas an increase in the width of the one-shot pulses extends the time of phase switchings and the motor stepping speed is decreased. In accordance with derived parameters, there are 2 n phase switchings and 2 n speed one-shot pulses for n character steps. As illustrated in FIG. 3, the leading edge of the 2 n-1 speed one-shot pulse 94 triggers a delay one-shot pulse 96, and the final phase switching occurs on the falling edge of this pulse.

A speed signal or speed envelope 98 of certain duration is produced at the test point 76, such signal beginning at the time of first phase switching and ending at the triggering of the delay one-shot pulse 96 (FIG. 3). The triggering of the delay one-shot pulse 96 determines the time period or width of the speed envelope 98. For a given sequence covering seven characters, the width of the speed envelope pulse 98 is 23.5 milliseconds, such pulse width being achieved and maintained by adjusting the potentiometer 74 of the speed one-shot 72. If this pulse width or speed envelope 98 is repeated at regular intervals, the meter 78 (with a sufficiently long time constant), connected between the test point 76 and ground 80, will indicate a voltage which is proportional to the width of the speed envelope 98. The voltage pulses of 0-5 volts produced at the test point 76 are read by the meter 78 as an average of the amplitudes of such voltages.

During alternate time intervals of approximately 1 second, i.e., period equal to 20 times nominal 50 milliseconds clock pulse, the stepping motor 16 is caused to be moved 20 times through the seven character steps (speed envelope), with the start of each seven character stepping sequence being synchronized with the transport clock 66 which has, as designated above, the nominal pulse period of 50 milliseconds and which pulse period is of sufficient length to allow the meter 78 to settle to an average voltage indication. During the opposing one second alternate time intervals, the microprocessor 62 generates, through programmed delays, i.e., those delays which are inherent within the instruction cycle times, a fixed reference signal or envelope of 23.5 milliseconds in width at the speed envelope test point 76, such reference envelope being also synchronized with the transport clock 66 and generated 20 times during such one second period. The test point 76 serves as a common access port for both the speed and reference signals.

Figure 4:
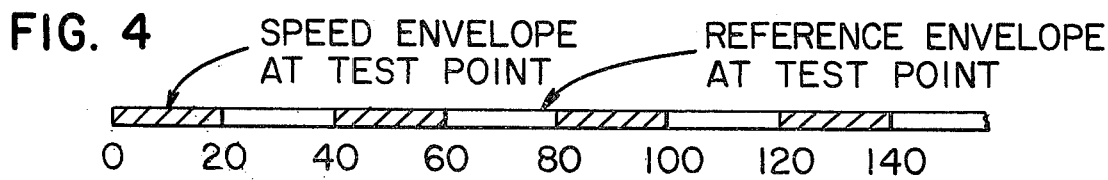
FIG. 4 is a diagram showing the sequence and time duration of speed and reference signals of the control system.

As seen in FIG. 4, which shows the sequence of speed and reference signals or envelopes appearing at the test point 76, the sequence is continued as long as required for completing speed adjustment in accordance with the instant invention. The sequence in FIG. 4 shows a series of such one second time periods of alternate speed and reference envelopes in relation to the 20 time cycles of the transport clock 66. With the generation of such speed and reference signals at point 76, the speed one-shot 72 may, if required, be then adjusted through the pulse width adjusting device 74 until the meter 78 needle remains steady which indicates that the width of the speed envelope is equal to the width of the reference envelope.

In analyzing the relationship of the length of pulse widths of the speed envelope and the reference envelope, it is seen that as the motor 16 is rotated the average voltage of the speed envelope 98 at the test point 76 is given by $$V_s = \frac{T_s}{T_x} \times V_{ref}$$

where $T_s$ = width of speed envelope
$T_x$ = period of transport clock
$V_{ref}$ = "ON" voltage of speed envelope Similarly, the average voltage of the reference envelope at test point 76 is given by $$V_r = \frac{T_r}{T_x} \times V_{ref}$$

where $T_r$ = width of reference envelope

The ratio of these two voltages is given by $$V_{ratio} = \frac{V_s}{V_r} = \frac{T_s}{T_r}$$

wherein it is seen that the voltage ratio is independent of both $V_{ref}$ (the "ON" voltage of the speed envelope) and the speed of the transport clock assuming that any perturbations in the period of the transport clock average out to zero.

The swing of the needle on the meter 78 can also be used to indicate the relative width of the speed and reference envelopes and whether the motor is running fast or slow. In this regard Let
$T_s = T_r + \Delta \times T_r$
where $$\Delta = \frac{T_s - T_r}{T_r}$$

that is, percent error = $\Delta \times 100\%$ the voltage ratio is given by $$V_{ratio} = \frac{T_s}{T_r} = \frac{T_r + \Delta \times T_r}{T_r} = 1 + \Delta$$

It is thus seen that the percentage difference in the respective widths of the speed and reference envelopes is directly proportional to the difference in the voltage readings.

Stepping motor and speed adjustments in an encoding mechanism generally have required in the past that a precise time base generator be used to initiate the seven character steps repetitively at fixed intervals. The output of the speed envelope is applied to a test point, however this voltage is referenced to another test point having a voltage equal to the average voltage of the speed envelope. A meter connected between these test points will then indicate zero volts at the correct speed adjustment.

Contrariwise, the apparatus and method of the present invention has eliminated the heretofore known drawbacks, viz. the meter must be accurately calibrated to indicate zero volts correctly, that the voltage at the reference test point must be precise, and that a precise time base was needed. Additionally, procedures have been simplified in that the test probe need not be moved from one test point to another since the reference and speed envelopes of the present invention are applied at the same test point as used in the symmetry test for the motor, which symmetry test requires adjustment only for a steady needle on the indicating device or meter.

Figure 5:
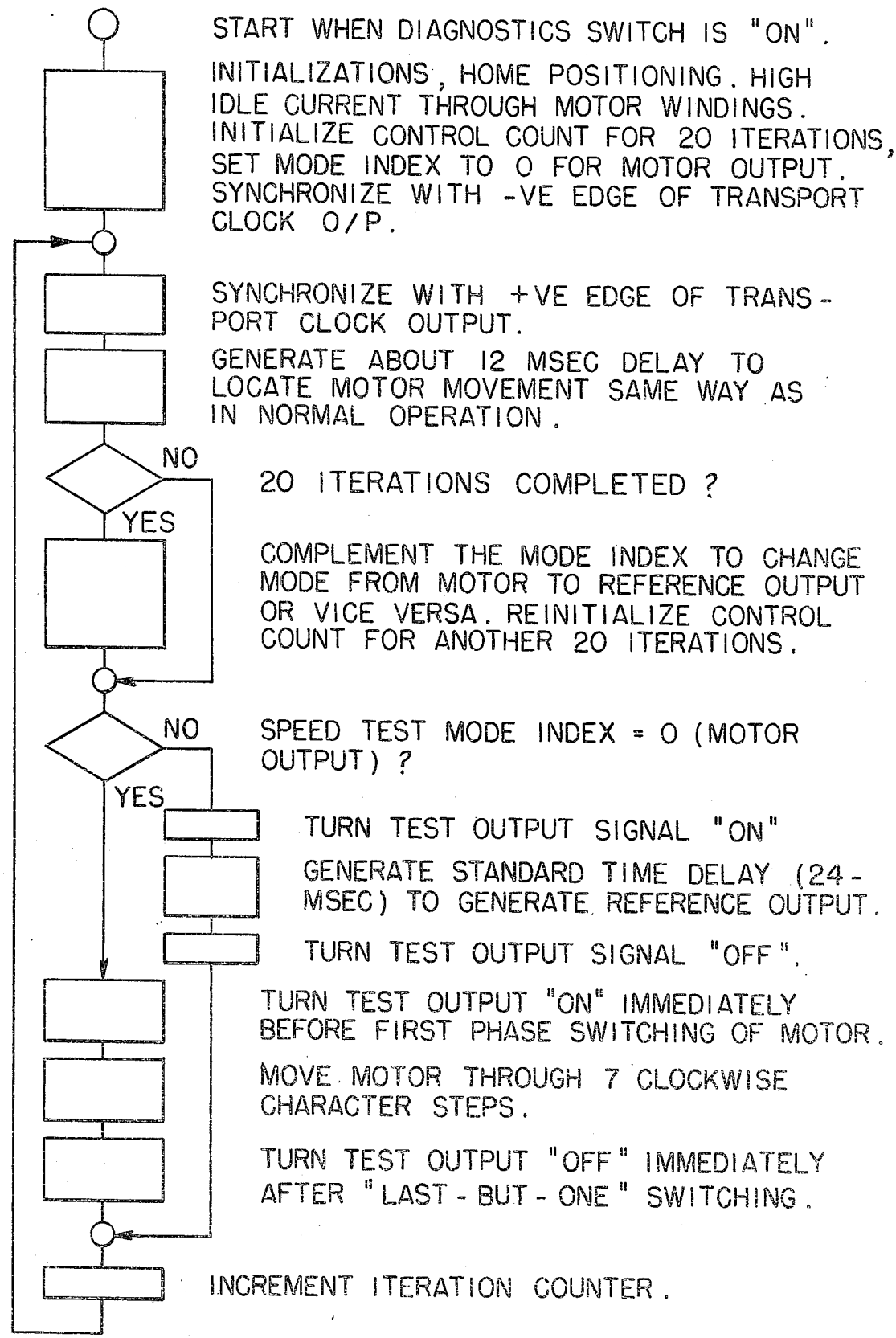
FIG. 5 is a flow diagram of the implementation of the speed adjustment of the stepping motor.

In FIG. 5 is shown a flow diagram of the implementation of the speed adjustment on the encoding mechanism application of the present invention wherein the program sets forth and completes a series of steps by the microprocessor 62 for controlling the speed of the stepping motor 16 in positioning the typewheel 12. The first steps cover the setting of or initiating the control count for 20 repeats of the seven character sequence along with setting of a mode index of the microprocessor to zero and synchronizing of negative and positive voltages of the transport clock 66. The mode index is used to ascertain whether to output the speed envelope or reference envelope to the test point 76. A 12 millisecond delay is generated to reflect the timing of motor positioning in normal operation after which it is determined whether or not the 20 repeats have been completed. If such 20 repeats are completed and the mode of the motor output is zero, the mode index is complemented to change the mode from the motor output to the reference output. The counter or register associated with the microprocessor 62 counts up by one on generation of the speed envelope 98, and likewise counts up by one on generation of the reference envelope, the generation of such speed and reference envelopes being under control of the microprocessor. If the speed test mode index equals zero, the test output is turned on just before the first phase switching of the motor 16, the motor is moved clockwise through the seven character steps, and then the test output is turned off just prior to the "next-to-last" phase switching. If the mode index does not equal zero after complementing from motor to reference output, the test output signal is turned on and a 24 millisecond delay is generated to the reference output. In either case, a repeat operation counter (FIG. 5) is incremented and another cycle is then begun. Implementation of the speed adjustment of the motor 16 may include an alternate step to that of incrementing the counter near the end of the program, such alternate step giving an indication whether the diagnostics switch is on or off. If this switch is still on, another cycle is set and completed. If this switch is off, the test is completed.

A modified form of the present inventive concept is shown in FIGS. 6, 7, and 8 for adjustment of the idling speed of an automobile engine 120 (FIG. 6) wherein a voltmeter 122 is connected between the test point P of a test set 124, which test set is connected by a spark plug lead 130 to the engine 120. The voltmeter 122 is connected to ground 126 and an idle adjusting device 128 (spark control, fuel-air mixture control, etc.) is used to set the idle engine speed. FIG. 7 shows a timing diagram of signals or pulses in the idle adjustment of the engine 120, with the engine being exemplified as running fast or above the correct idle speed. Basically, the speed of the engine 120 is a function of the rate of firing of the spark plugs employed, the timing diagram of FIG. 7 showing only the successive firings of one plug. For each pulse 132 of a fixed number of firings N of the spark plug, a microprocessor in the test set 124 detects the firing and outputs a pulse 134 of known width $T_1$, which pulse is output to test point P. The time between the completion of one pulse and the start of the next pulse (shown as $T_{2v}$) is variable and is a function of the engine speed. After completion of the above N firings, the microprocessor for N repeat cycles outputs to test point P a pulse 136 of width $T_1$ followed by no pulse for a fixed time $T_{2r}$, which time $T_{2r}$ is chosen to be equal to the width $T_{2v}$ when the engine is adjusted to the desired idle speed. At the completion of N cycles of generated reference pulses 136 at the test point P, the firing cycle is repeated until the engine speed adjustment is completed. The moving needle voltmeter 122 connected between test point P and ground 126 will indicate a steady needle position when the engine idle speed is correctly adjusted to the desired value. The number of cycles N of generated reference pulses at test point P must be sufficient to allow the meter 122 to reach a steady state condition.

In FIG. 8 is shown a flow chart of the implementation of the engine speed adjustment. Starting at I (counter set) equal to zero, the output pulse 134 of width $T_1$ is caused to appear at test point P when the spark plug fires. This indication results in $I = I + 1$. The next step determines whether or not $I = N$. If not, the above sequence is repeated until $I = N$. When $I = N$, I is then set to zero. An output pulse 136 of width $T_1$ is caused to be output to test point P, followed by a delay of time $T_{2r}$ during which no signal is output to test point P. This results in $I = I + 1$. The next step determines whether or not $I = N$. If not, the sequence is repeated until $I = N$. When $I = N$, the sequence associated with the spark plug firing is repeated. The above cycle continues until the meter 122 connected to test point P indicates a steady reading, thereby indicating correct adjustment of the engine idling speed.

A further form of the inventive concept is shown in FIG. 9 wherein an induction motor 150 drives a turntable 152. A sensor 154 senses the speed of rotation of the turntable and is connected to a test set 156. A speed adjusting device 158 is connected to the motor 150, which device may, for example, be in the form of a potentiometer to effect speed adjustment to the motor, as determined by the needle of a voltmeter 160 connected between a test point P of the test set 156 and a ground 162. Again the test set includes a microprocessor with associated apparatus and circuitry to program the various steps of implementing the adjustment procedure. It is to be noted that while a microprocessor is well-adapted to provide the processing logic of such various steps, hardwired logic could also be used in the invention.

To further aid in understanding the timing of the respective pulses or signals, FIG. 10 shows a timing chart of the relationship between the continuous cycle of clock pulses and the speed and reference envelopes, which chart relates one test condition of times of predetermined and actual operational signals. As mentioned earlier, the clock pulse has a nominal period of 50 milliseconds, designated as pulse 170, such pulse period being constant during the entire time of operation of the adjusting procedure. Likewise, the reference envelope has a predetermined time of 23.5 milliseconds for the first portion 172 of its cycle, such time periods also being constant during the entire time of operation. Regarding the speed envelope (i.e., the moving of the stepping motor 16 through the seven character steps), it is assumed that the speed of such motor requires an adjustment thereof to properly position the type characters 14 for printing. While an initial time period or pulse may be of shorter or longer duration, for purposes of the present description, a first portion 176 of the speed envelope is shown in FIG. 10 as being 15.5 milliseconds with the latter portion then being 34.5 milliseconds. It is of course readily noted that the first portion of the speed envelope may have an initial time period longer than 23.5 milliseconds and that the adjustment would be needed to correct back to the 23.5 millisecond period. Also, while a plurality of like speed envelopes will follow initially until the required adjustment operation is commenced, for purposes of illustration a first portion 180 of a second speed envelope is shown in FIG. 10 as 16.5 milliseconds with the second portion 182 of such envelope being 33.5 milliseconds. Further, the first portion 184 of a third speed envelope is 17.5 milliseconds with the latter portion of such envelope being 32.5 milliseconds. After the number of like speed envelopes have been initially seen at the test point 76, through adjustment of the potentiometer 74 the above representative speed envelope changes occur until the first portion 186 of a succeeding speed envelope has a time of 23.5 milliseconds which is the desired time for the speed envelope as compared to the reference envelope. The above pulse width adjustment of the speed envelope is performed during a period of time by observing the position of the needle of the voltmeter 78 while adjusting the potentiometer 74 to produce a speed envelope of 23.5 milliseconds comparable to the 23.5 millisecond period of the reference envelope.

It is thus seen that herein shown and described is apparatus and method for adjusting the speed of a prime mover wherein logic is provided by a microprocessor in a manner which utilizes alternate signals in circuitry along with means for indicating when the prime mover is or is not running at the desired speed. The desired speed of such prime mover is attained when the width of the speed envelope equals the width of the reference envelope. The apparatus and method comprises a control system which enables the accomplishments of the objects and advantages mentioned above, and while several embodiments have been disclosed herein, variations thereof may occur to those skilled in the art. It is contemplated that all such variations not departing from the spirit and scope of the invention hereof are to be construed in accordance with the following claims.

What is claimed is:

1. A method of controlling the speed of a prime mover comprising the steps of
   generating a programmed reference signal of predetermined time duration;
   generating a speed signal indicative of the actual speed of the prime mover in successive relationship with said reference signal;
   generating a delay signal after initiation of the generation of each speed signal for determining the time duration of each of said speed signals; repeating said reference signal in duplicating manner for a desired number of times;
   repeating said speed signal sequentially in alternate relationship with said reference signal for said desired number of times;
   utilizing programmed memory for tracking the number of repeated speed signals and reference signals;
   synchronizing said reference signals and said speed signals by clocking predetermined time periods therewith;
   setting the programmed memory to indicate mode index of the prime mover,
   connecting voltage indicating means with the output of said prime mover for receiving said speed signals and with said programmed memory for receiving said reference signals after completion of said desired number of times, observing differences in time periods between said reference signals and said speed signals by reading the range of voltage indication; and
   adjusting the width of said speed signals to equal the width of said reference signals until a steady voltage indication is observed.

2. A control system for adjusting the speed of a prime mover to conform with predetermined parameters, including:
   microprocessor means for generating repeated cycles of reference signals of fixed time duration;
   memory means associated with said microprocessor means for reading the number of cycles of fixed time duration of said reference signals; multivibrator means for generating signals indicative of the speed of said prime mover in alternate relationship with said reference signals and in sequential manner therewith;
   delay means associated with said microprocessor means for determining the time duration of said speed signals;
   clock means for synchronizing said reference signals and said speed signals;
   voltage responsive means connected with said microprocessor means to receive said reference signals and with said multivibrator means to receive said speed signals for indicating differences in time duration between said reference signals and said speed signals by range of voltage observed; and
   potentiometer means connected with said multivibrator means for adjusting the width of said speed signals to correspond with the width of said reference signals at a steady voltage indication.

3. The system of claim 2 wherein said reference signal generating means comprises a microprocessor programmed to repeat cycles of reference signals to said indicating means.

4. The system of claim 2 wherein said speed signal generating means comprises a one-shot multivibrator associated with said prime mover for generating alternate speed signals.

5. The system of claim 2 wherein said indicating means comprises a voltage responsive device for indicating a voltage differential proportional to the pulse width of said reference signals and to the pulse width of said speed signals.

6. The system of claim 2 wherein said adjusting means comprises a potentiometer device associated with said speed signal generating means.

7. The system of claim 2 wherein said prime mover is a stepping motor.

8. The system of claim 2 wherein said prime mover is an induction motor.

9. The system of claim 2 wherein said prime mover is an internal combustion engine.

10. The system of claim 4 wherein said adjusting means comprises a potentiometer device associated with said one-shot multivibrator permitting adjustment of the width of said speed signals generated thereby.

11. In a printer having a rotatable type character carrying member, drive means for rotating said member, hammer means for impacting against the type characters, and means for adjusting the speed of rotation of said drive means to be compatible with the impacting of said hammer means comprising:
   processor means programmed for generating repeated cycles of reference pulses of fixed time duration; multivibrator trigger means associated with said drive means for generating pulses indicative of the speed of rotation of said drive means;

said speed pulses occurring in alternate relationship with said reference pulses and in sequential manner therewith;

memory means associated with said processor means for reading a number of cycles of alternate reference pulses and speed pulses;

delay means associated with said processor means for determining the time duration of said speed pulses;

clock means for synchronizing said reference pulses and said speed pulses at the time of initation of each respective pulse;

voltage responsive means connected with said processor means and with said multivibrator trigger means to receive said reference pulses and said speed pulses for indicating difference in pulse width between said reference pulses and said speed pulses by observing range of voltage indicated; and potentiometer means connected with said multivibrator trigger means for adjusting the width of said speed pulses to correspond with the width of said reference pulses at a steady voltage indication observed.

12. In the printer of claim 11 wherein said drive means comprises a stepping motor for incrementally rotating said type character carrying member.

* * * * *

UNITED STATES PATENT OFFICE
CERTIFICATE OF CORRECTION

Patent No. 4,127,800  Dated November 28, 1978

Inventor(s) Donald E. Long, Robert J. Rushby, Krantikumar V. Toraskar

It is certified that error appears in the above-identified patent and that said Letters Patent are hereby corrected as shown below:

Claims 3, 4, 5, 6, and 10, being original claims 8, 9, 10, 11, and 15, respectively in application, were cancelled by Applicant during prosecution of application.

On the cover sheet, "12 claims" should read -- 7 Claims --.

Signed and Sealed this

Thirteenth Day of March 1979

[SEAL]

Attest:

RUTH C. MASON
Attesting Officer

DONALD W. BANNER
Commissioner of Patents and Trademarks